US009887551B2

(12) United States Patent
Beck

(10) Patent No.: US 9,887,551 B2
(45) Date of Patent: Feb. 6, 2018

(54) METHOD FOR OPERATING AN ENERGY GENERATOR WITH INVERTER OPERATION DEPENDING ON A MAINS VOLTAGE AND CIRCUIT LAYOUT

(75) Inventor: Bernhard Beck, Volkach OT Dimbach (DE)

(73) Assignee: BOB Holding GmbH, Volkach (DE)

( * ) Notice: Subject to any disclaimer, the term of this patent is extended or adjusted under 35 U.S.C. 154(b) by 1173 days.

(21) Appl. No.: 13/267,850

(22) Filed: Oct. 6, 2011

(65) Prior Publication Data

US 2012/0091805 A1    Apr. 19, 2012

(30) Foreign Application Priority Data

Oct. 6, 2010   (DE) .................. 10 2010 047 652

(51) Int. Cl.
*H02J 3/14*     (2006.01)
*H02J 3/50*     (2006.01)
*H02J 3/18*     (2006.01)

(52) U.S. Cl.
CPC .............. *H02J 3/50* (2013.01); *H02J 3/18* (2013.01); *Y02E 10/563* (2013.01); *Y02E 40/30* (2013.01); *Y10T 307/406* (2015.04)

(58) Field of Classification Search
CPC ....................................... H02J 3/18; H02J 3/50
(Continued)

(56) References Cited

U.S. PATENT DOCUMENTS

| 8,373,291 | B2 | 2/2013 | Zeumer et al. | |
| 2007/0290506 | A1* | 12/2007 | Walling | H02J 3/16 290/44 |

(Continued)

FOREIGN PATENT DOCUMENTS

| AU | 2008264176 A1 | 1/2009 |
| DE | 740 043 C | 10/1943 |

(Continued)

OTHER PUBLICATIONS

Ladesma P et al: "Contribution of Variable-Speed Wind Turbines to Voltage Control", Wind Engineering, Multi-Science Publishing Co., Brentwood, Essex GB, vol. 26, Nr. 6, Jan. 1, 2002, pp. 347-358.

(Continued)

*Primary Examiner* — Jared Fureman
*Assistant Examiner* — Joel Barnett
(74) *Attorney, Agent, or Firm* — Muncy, Geissler, Olds & Lowe, P.C.

(57) ABSTRACT

A method for operating a first energy generator in an electric power supply system to which a plurality of electric consumers and at least the first energy generator, which is embodied as a regenerative energy generator, are connected via respectively one grid connection point each assigned thereto, wherein at least the first energy generator has an inverter of predetermined power rating, the AC voltage output of which is electrically connected to a first grid connection point assigned thereto, and wherein the operating control of the inverter regarding its reactive power feed and/or its reactive power draw into or out of the electric power supply system takes place depending on a continuously measured mains voltage value. The reactive power control in the energy grid is improved in that the mains voltage value is measured at a second grid connection point, which is different from the first grid connection point of the energy generator.

17 Claims, 4 Drawing Sheets

(58) Field of Classification Search
USPC .......................................................... 307/31
See application file for complete search history.

(56) References Cited

U.S. PATENT DOCUMENTS

| | | | | |
|---|---|---|---|---|
| 2008/0073912 | A1* | 3/2008 | Fortmann et al. | ............... 290/44 |
| 2009/0096212 | A1 | 4/2009 | Turner et al. | |
| 2010/0067271 | A1* | 3/2010 | Garces et al. | .................. 363/95 |
| 2010/0208501 | A1* | 8/2010 | Matan et al. | .................... 363/95 |
| 2011/0204717 | A1* | 8/2011 | Shaffer | .................. G06Q 40/04 |
| | | | | 307/18 |

FOREIGN PATENT DOCUMENTS

| | | |
|---|---|---|
| DE | 100 200 635 A1 | 3/2001 |
| DE | 199 61 705 A1 | 7/2001 |
| DE | 101 36 974 A1 | 11/2002 |
| DE | 10 2004 048 341 A1 | 4/2006 |
| DE | 10 2007 044 601 A1 | 4/2009 |
| DE | 10 2008 048 258 A1 | 4/2010 |
| EP | 2 226 500 A2 | 9/2010 |
| WO | WO 2009/083448 A2 | 7/2009 |

OTHER PUBLICATIONS

Brauner G: "Netzanbindung von Windkraftanlagen" translated as "Connection of Wind Power Stations to the Power System", Elektrotechnik und Informationstechnik, Springer Verlag, Vienna, AT, vol. 116, No. 7/08, Jan. 1, 1999, pp. 428-432.

* cited by examiner

METHOD FOR OPERATING AN ENERGY GENERATOR WITH INVERTER OPERATION DEPENDING ON A MAINS VOLTAGE AND CIRCUIT LAYOUT

This nonprovisional application claims priority under 35 U.S.C. § 119(a) to German Patent Application No. DE 10 2010 047 652.8, which was filed in Germany on Oct. 6, 2010, and which is herein incorporated by reference.

BACKGROUND OF THE INVENTION

Field of the Invention

The invention relates to a method for operating a first energy generator in an electric power supply system to which a plurality of electric consumers and at least the first energy generator, which in particular is embodied as a regenerative energy generator, are connected via respectively one grid connection point each assigned thereto, wherein at least the first energy generator has an inverter of predetermined power rating, the AC voltage output of which is electrically connected to a first grid connection point assigned thereto, and wherein the operating control of the inverter regarding its reactive power feed and/or its reactive power draw into or out of the electric power supply system takes place depending on a continuously measured mains voltage value ($N_{Netz}$).

Description of the Background Art

In the practice of public power supply, in the electric power supply system depending on the supply voltage level, which in Germany, for example, ranges from 380 kV and 110 kV as the high-voltage level, via 15 kV to 70 kV as the medium-voltage level down to 230 volts on the low-voltage level, more or less narrow limits are set by the energy providers or system operators for the current quality or voltage quality with respect to the reactive power component of the power suppliers and the power consumers, represented by the cos phi value in the phasor diagram of current and voltage.

In Germany, the permissible value of cos phi for a reactive power draw without penalty or a reactive power feed-in is 0.95. This limit setting serves to stabilize the grids in order to avoid an overvoltage, which can lead to a destruction of connected consumers, and an undervoltage, which can lead to a failure of consumers. The price serves as a counterbalance to maintain the set cos phi values. Thus a feed or a draw of reactive power outside the bandwidth stipulated by the energy generator or higher-level grid operator for the cos phi is punished by substantial fines.

A variety of installations for generating electric energy are known. Every photovoltaic plant, hereinafter also referred to as a PV plant, generates a direct current, which is converted into an alternating current by means of an inverter and, with suitable conditions, is fed into an electric power supply system. Purely electronic devices as well as electromechanical rectifiers can be used as inverters. Inverter is understood thereby to mean all of the devices that can generate an alternating current from a direct current. Thus wind energy plants generate an alternating current directly. However, this has to be adjusted to the conditions of the public supply system (energy power supply system) via a frequency converter. These frequency converters likewise comprise inverters according to the invention.

The electronic components of an inverter, just like the combination of a direct current machine with a synchronous generator as a mechanical inverter, permit the adjustment of a desired cos phi value. This occurs in most PV plants by means of a cos phi indicator, via which a fixed ratio of fed power to fed or drawn reactive power can be adjusted. Thus the control unit, e.g. is instructed to adjust each power fed into the grid at a cos phi of 0.97.

For example, from unexamined German application DE 199 61 705 A1 an inverter for a photovoltaic plant is known, by means of which a solar system can be connected to an electric power supply system and which has a control unit for the dynamic calculation of a compensation current to compensate for harmonics and reactive power in the grid. The operation of the inverter with the control unit is intended to improve the mains voltage quality in the electric power supply system.

The control unit calculates a compensation current desired value based on a measured mains voltage value. The measuring element of the mains voltage measurement is thereby arranged at that connection point at which the inverter feeds the energy into the grid.

In the case of larger and modern installations, the cos phi value is not necessarily fixedly stipulated, but can be adjusted dynamically in operation according to a diagram corresponding to FIG. 1 depending on the momentary requirements. There a cos phi value (cos φ) to be adjusted is plotted at the output of the inverter over the mains voltage. The output voltage $U_{Netz}$ for feeding into the grid may vary only within a range between the minimum value $U_{min}$ and a maximum value $U_{max}$. The PV plant should not be operated outside this range of feeding into the grid with a cos phi of e.g., no more than 0.95, permitted by the energy supplier. Within this permitted range lies a narrower range between a minimum control voltage $U_{regel\ min}$ and a maximum control voltage $U_{gel\ max}$, in which pure power without a reactive power component can be delivered to the grid. In the center of this narrow range lies the desired voltage $U_{soll}$.

The invention is now based on the concept that it can be useful for a grid operator or energy supplier to coordinate the energy generators and/or energy consumers operating in the grid with one another such that the individual installations of grid participants which can be combined administratively or in the operating control by the grid operator or energy provider in order, for example, to form a virtual power plant, are operated more unfavorably regarding the cos phi in order in the interaction with other elements overall to create more favorable conditions in her ratio of reactive power and active power and to avoid impending fines of their own to the higher-level system operators.

Thus energy providers, above all in their contractual relationship with the higher-level system operators (e.g., nuclear power plant, coal-fired power plant, etc., as energy supplier), are contractually obligated not to fall below a reactive power demand value of cos phi 0.95 in order to ensure the voltage stability in the supraregional higher-level grid. However, an import of reactive power is often necessary in the lower-level grids, in order to compensate for a voltage increase through the feed-in of solar power and wind power or to compensate for a drop in voltage due to the failure of a supply of alternatively generated energy or the start up of machines.

SUMMARY OF THE INVENTION

It is therefore an object of the present invention to contribute to the increase in the quality of supply in an electric power supply system.

This object is attained according to the invention in that the mains voltage value ($N_{Netz}$) for the operating control of the first energy generator is measured at a second grid connection point, which is different from the first grid connection point of the energy generator.

The operating control of the inverter of a first energy generator thus is no longer based on the mains voltage value locally measured at the site of the first energy generator, but a value measured at a suitable point, namely a second grid connection point in the electric power supply system. Thus the critical ratio of active power and reactive power can be optimized, taking into consideration higher-ranking aspects and taking into greater account the influence of other grid participants, than if only the local variables on site (first grid connection point) of the first energy generator are drawn on themselves. Thus untapped possibilities are also to be utilized of using inverters connected to the grid as a reactive power supplier or consumer.

For example, the second grid connection point can thereby be identical to a point of the connection of the electric power supply system with a electric power supply system higher-ranking than this or at least nearer thereto than the first grid connection point. The control of the first energy generator can thus then be directed at an optimized cos phi of a total sub-grid.

An embodiment of the invention thereby provides for the electric power supply system to have different ranges on different voltage levels and for the second grid connection point to be arranged on a different voltage level than the first grid connection point of the inverter. Through this embodiment the optimization of the supply voltage quality also can be optimized over several mains voltage levels.

Each inverter, which operates at maximum capacity, can provide only a defined reactive power component, which must be larger than or equal to cos phi=0.95. If this inverter is located, e.g., at an operating point at which only half the power rating can be generated, under the normal control scheme only half the reactive power component could be supplied or drawn. However, due to its technical possibilities, the inverter could provide a higher kvar amount. To this end, however, the circumstances at the current voltage conditions in the electric power supply system, even distant from the first grid connection point, would have to be known, so that its kvar contribution does not act in a counterproductive manner.

The operating control according to the invention of the inverter depending on a voltage that is external from its viewpoint, which corresponds to a voltage at a different location in the electrical grid in terms of grid topology, in particular also geographically, makes it possible for the operators of regenerative energy installations of the cited kind to profitably use their possibilities provided by the inverter for the cos phi variation for a larger range of the electric power supply system.

It can be provided that at least one, in particular at least two, advantageously at least three, further advantageously at least five further grid connection points and/or a transformer is/are arranged between the first grid connection point and the second grid connection point.

At least one grid connection point of a capacitive or inductive consumer can be arranged between the first grid connection point and the second grid connection point.

Another embodiment of the invention provides that the operating control of the inverter is directed to an optimization, in particular maximization, of the active power emitted into the electric power supply system (operation at the maximum power point MMP). In particular a specific absolute or maximum definable reactive power value or a specific reactive power component (feed or draw) or maximum reactive power component of the active power is thereby maintained.

Thus the reactive power component (with the stipulation of an absolute value) is restricted to the power remaining up to the power rating of the inverter is reached. The energy generated by the energy generator itself is not thereby restricted or reduced. The free power capacity of the inverter is used only to fulfill a further function, namely that of the phase shifter or reactive power supplier. If the reactive power component is stipulated as the desired value or the maximum limit, the operating conditions of the inverter and of the first energy generator can nevertheless be optimized within limits despite the orientation to higher quality objectives of the supply voltage.

It can also be provided that the operating control of the inverter, avoiding the control system therein, provides to feed in a predetermined reactive power component into the supply level or to draw it therefrom up to the maximum power point MPP. This is useful when, due to the current grid conditions, it is more lucrative for the solar plant operators to supply reactive power than power that can be used to drive machines, operate air conditioners etc.

According to one embodiment of the invention it can also be provided that the operating control of the inverter is aligned to an optimization, in particular maximization, of the active power delivered into the electric power supply system (operation at the maximum power point MPP), wherein in addition it feeds a reactive power quantity into the electric power supply system or draws it therefrom, which corresponds to no more than the difference of the currently delivered active power to the power rating of the inverter. Thus, if it is established, for example, that a phase shift is required in a certain sense in the electric power supply system, it can be ensured that the first energy generator always supplies the full contribution possible for him to achieve the phase shift and thus to improve the grid quality.

A particularly suitable location for measuring the mains voltage value ($U_{Netz}$) is with a grid connection point at the end of a stub line or, with respect to a mains transformer feeding a ring circuit, in the center of the ring circuit. That is where the consumers are located that have the lowest mains voltage available. Due to the other consumers ahead of them regarding the energy feed into the grid, all of which cause a marginal voltage drop, there the available voltage is generally lowest, unless an additional energy supplier (in connection with the present application also referred to as "energy generator," although naturally it cannot be a matter of a generation of energy, but only of a conversion into electric energy) is connected in the vicinity. The terms "at the end of a stub line" and "with respect to a mains transformer feeding a ring circuit, in the center of the ring circuit" are thereby to be interpreted in the light of the following statements.

For example, if a stub line is given with 200 connection points, the end of the sub line comprises the last 20%, in particular the last 10% of the connection points. Therefore the last 40, in particular the last 20 connection points are arranged at the end of the stub line. Analogously, the respectively 20, in particular the respectively 10 to the left and to the right of the center (which, counted from a grid connection point of the ring circuit, lies between the $100^{th}$ and the $101^{st}$ connection point) connection points would be seen with a ring circuit of 200 connection points.

In general the most voltage-sensitive grid connection point can be selected as the second grid connection point, at which the mains voltage value ($N_{Netz}$) is measured for the operating control of the inverter of the first energy generator. This can be a location at which a consumer is located which operates heavy machinery with a high initial current which are frequently turned on and off.

Thus, that grid connection point of a grid participant with the largest deviation time integral from the reactive power component averaged in terms of time can be selected for the measurement. Another alternative in the embodiment of the invention is that the consumer with the highest fluctuation range in the reactive power demand is determined, and that the measurement of the mains voltage value ($N_{Netz}$) is carried out at the grid connection point of this consumer.

The operating control of the inverter of the first energy generator is such that a measured undervoltage below a threshold value leads to a feed-in of reactive power on the part of the inverter. An imminent overvoltage, e.g., when an upper threshold value is reached, leads to a draw of reactive power by the inverter.

A larger-area monitoring and optimization of the voltage situation in the electric power supply system can be achieved in that the mains voltage ($U_{Netz}$) at the grid connection points (1 through n) of several consumers at the same voltage level is determined and the operating control takes place based on the correspondingly several mains voltage values ($U_{Netz\ 1}$) to ($U_{Netz\ n}$) in particular based on a constructed mains voltage value ($U_{Netz}$) determined by connection of different mains voltage values ($U_{Netz\ 1}$ through $U_{Netz\ n}$).

The different mains voltage values ($U_{Netz\ 1}$ through $U_{Netz\ n}$) can be connected by forming an average to a mains voltage value ($U_{Netz}$), for example, wherein in particular certain mains voltage values ($U_{Netz\ 1}$), for example, of grid participants with larger active power feed-in/active power demand or lower reactive power fluctuation are weighted more than other grid participants with lower active power feed-in/active power demand or higher reactive power fluctuation. The weighting can also be designed such that a mains voltage at a grid connection point that is closer to the connection point of the electric power supply system with a higher-level grid than other grid connection points, is weighted more in averaging than the mains voltage values measured at the other grid connection points.

It can also be provided that the connection of the mains voltage values is changeable in terms of time, and that respectively a measured mains voltage value with a higher rate of change of the cos phi is weighted more than mains voltage values with a lower rate of change of the cos phi.

A lower electrical grid that is operated from a higher-level (superordinate) electrical grid can also be seen as a consumer. Thus, e.g., a transformer that steps down from a 5 kV level to a 380 volt level and supplies a locality with power, can be seen as a consumer for the higher 5 kV grid. Optionally, the voltage at the transformer is measured and drawn on for operating control of a large scale photovoltaic plant, for example, the inverter devices or inverter machines of which feed into the medium-voltage level directly or via an associated transformer.

If there are several suppliers of regenerative energy with respectively assigned grid connection point in the same electrical grid, it can be advantageous for the reactive power component to be supplied to be divided among the correspondingly several inverters such that the inverters involved operate in total in a manner as low-loss as possible. This renders possible an efficient utilization of the available reactive power capacities. For the same reason it is expedient for that energy generator to be preferably used for reactive power feed-in or for reactive power draw which is adjacent in terms of distance or grid topology to that grid connection point at which the voltage value is determined and which is approaching a critical value.

To protect the inverter and the photovoltaic plant, the control unit has a limiter, which reduces the stipulated reactive power quantity such that a maximum permissible voltage at the output of the inverter is not exceeded. It is likewise expedient to provide the control unit with the possibility of controlling the predetermined reactive power quantity such that a minimally permissible voltage is not fallen below at the input of the inverter.

Apart from a method for operating a first energy generator, the invention also comprises a corresponding method for operating several energy generators in an electric power supply system, wherein at least two regenerative energy generators feed into a single voltage level via grid connection points respectively assigned thereto, and wherein their reactive power component to be respectively supplied is divided among the inverters respectively assigned thereto such that the power loss of the inverters in total is minimized.

It can further be provided within the scope of the invention that, with at least two energy generators to be controlled, that energy generator is preferably used for reactive power feed-in or for reactive power draw which is closest in terms of distance or grid topology to the grid connection point at which the mains voltage value ($U_{Netz}$) is determined.

Through a superordinate method of this type for operating several energy generators in an electric power supply system, the use of the entire electric power supply system can be prioritized compared to the optimized operation of individual energy generators.

Moreover, the invention also relates to a circuit layout with an energy generator for an electric power supply system, which has an inverter as well as a control device for the inverter. The output of the inverter is connected to a first grid connection point for feeding electric power into the electric power supply system. The control device is connected to a second grid connection point, which is different from the first grid connection point and is spaced apart therefrom.

A circuit layout of this type permits an operation according to the method variants explained in more detail above to the advantage of the improved supply quality of an electric power supply system.

In the embodiment of the cited circuit layout, it can be advantageously provided that between the first grid connection point and the second grid connection point at least one further, in particular at least two further, advantageously at least five further grid connection points are arranged with consumers and/or further energy generators connected thereto.

A circuit layout can also be provided with at least two energy generators for an electric power supply system, which respectively have an inverter as well as a control device for the inverter. The outputs of the inverters are connected to a first and a third grid connection point for feeding electric power into the electric power supply system. The control devices are connected to a second and accordingly a fourth grid connection point, which are respectively different from the first and second grid connection points and spaced apart therefrom.

This circuit layout with two or more energy generators renders possible an optimization of the operation by an optimized interaction with the control/regulation of the reactive power components adjusted by the individual energy generators and the inverters assigned thereto.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
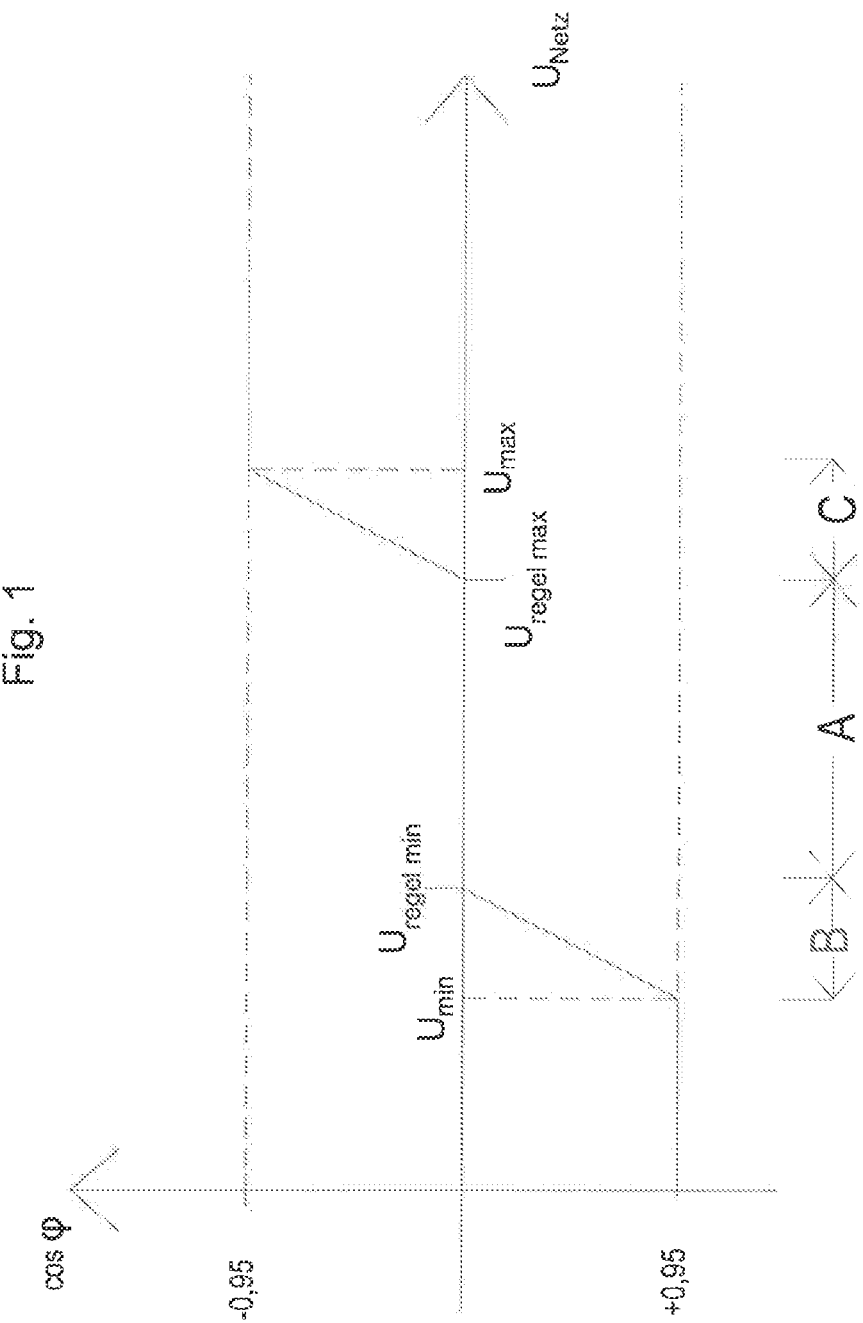
FIG. 1 is a control diagram of an inverter of a solar plant for adjusting a cos phi value (cos φ) via the output voltage.

FIG. 1 shows this type of control diagram of the cos phi (cos φ) over the inverter output voltage U, which in principle is advantageously used with modern PV plants and which is intended to facilitate understanding of the following description.

Two limit values $U_{min}$ and $U_{max}$ are provided, which in general are not to be fallen below or exceeded. Between these boundary limit values $U_{min}$ and $U_{max}$ lies a linear control range A, which is delimited by two control limit values $U_{regel\ min}$ and $U_{regel\ max}$. In this range A the plant is operated cos phi neutral and pure active power is fed into the electrical grid. If the operating point of the inverter with its output voltage U is in the range B between $U_{min}$ and $U_{regel\ min}$, in addition reactive power kvar (Kilovolt-amperes reactive) is supplied to the electrical grid.

Analogously, with an operating point of the inverter with an output voltage U in the range C between $U_{max}$ and $U_{regel\ max}$ in addition to the power feed-in, reactive power kvar is drawn from the electrical grid. The operating point is thereby adjustable via the semiconductor elements, in particular IGBTs (insulated gate bipolar transistor), that is, bipolar transistors with insulated gate electrode, in the inverter and is adjusted via a so-called MPP (maximum power point) controller. The MPP controller thereby utilizes the entire voltage bandwidth between $U_{min}$ and $U_{max}$, in order to generate as much useable electrical active power as possible at the PV generator. At the two upper and lower limit values there are additional emergency flanks, which are not dealt with in further detail here.

Depending on the operating point, accordingly under some circumstances a reactive power draw from the grid occurs, which generally means a tendency towards voltage reduction of the mains voltage. A reactive power feed-in can also result, which means an increase in voltage on the supply level to which the inverter is connected.

Figure 2:
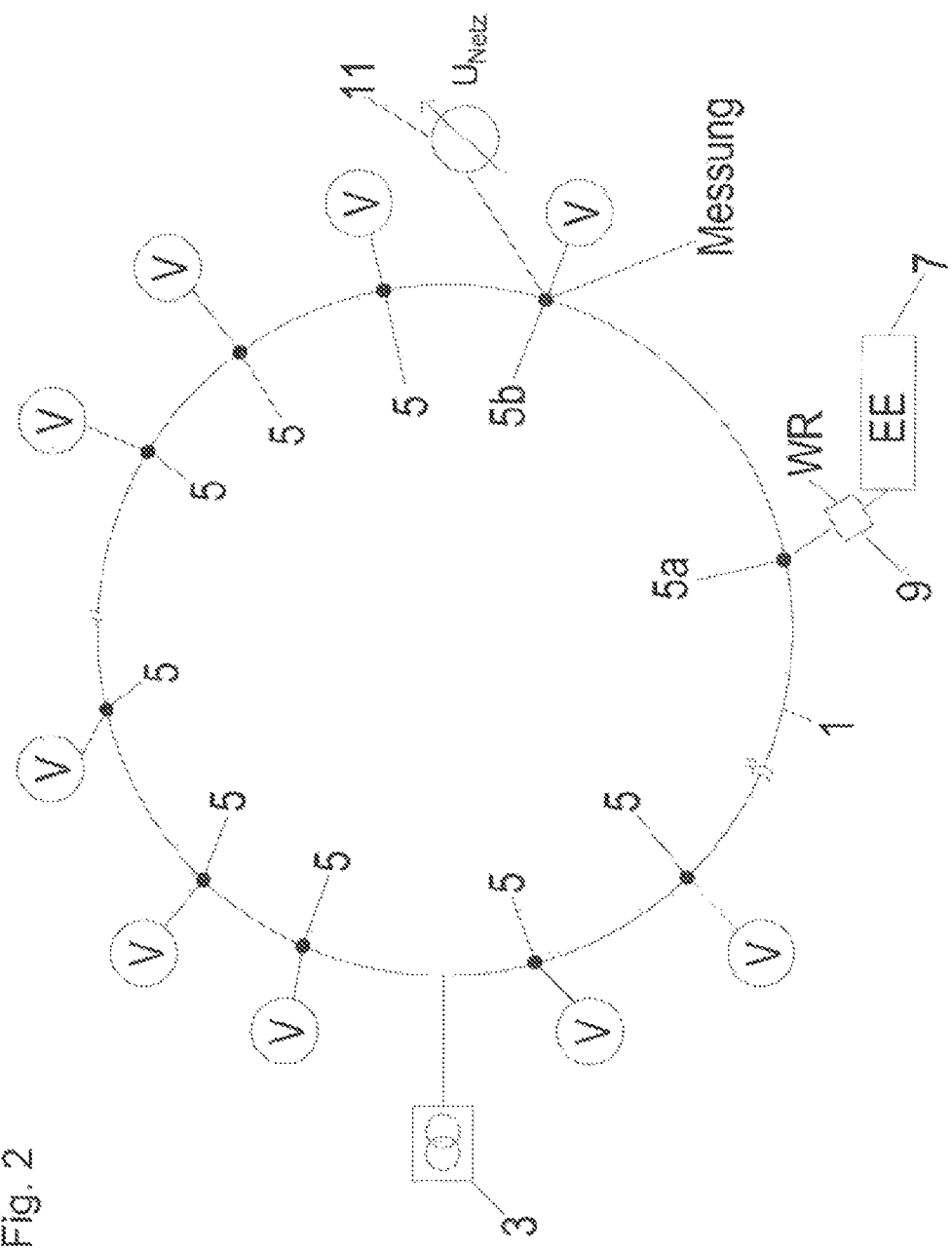
FIG. 2 is a ring circuit with a supply transformer and grid connection points.

FIG. 2 shows a ring circuit 1, which is supplied with electric current by a transformer 3. A plurality of grid connection points 5 are present on the ring circuit 1, each of which represents a connection point for consumers V or energy generators EE, such as, for example, a photovoltaic generator 7 with its inverter 9 assigned thereto. For example, the transformer 3 is a medium-voltage transformer, which steps down from a higher 20 kV supply level to a 400 volt undervoltage level and which accordingly connects an overvoltage grid (20 kV) to an undervoltage grid (400 V).

The individual consumers V are private households, craftsman's businesses, commercial operations such as supermarkets, building supplies stores, smaller industrial operations etc. In all, in the example 200 consumers V and energy generators EE are to be connected via correspondingly 200 assigned grid connection points 5 to the ring circuit 1. A consumer V can thereby also temporarily act as an energy generator EE. In particular the latter case, which addresses the PV roof installations on barn roofs, industrial shop roofs, private house roofs, etc., leads to an undesirable influence of the mains voltage via the kvar supply or the kvar draw of the inverters assigned to the roof installations. As a result the electrical grid, here specifically the voltage on the ring circuit 1, tends to instability.

This instability in the vicinity of the feed-in connection point 5 of the transformer 3 is low and becomes greater, the further the consumer V is from the feed-in point. Each consumer V tends to contribute to the weakening of the voltage stability. In the center of the ring circuit 1, that is, in the vicinity of the $100^{th}$ consumer V, under unfavorable circumstances a voltage drop can then occur which impairs the use of electric devices. This is manifested, e.g., by light flickering, when in addition an electrical machine is started up by the consumer or in his vicinity.

This undesirable voltage drop can be counteracted by a supply of reactive power. To this end a large energy feeder/energy consumer EE, which is connected via its own grid connection point 5a to the ring circuit 1, is changed from its purely power-optimized operating control. This is carried out in that the operating point of the inverter 9 is modified such that it additionally or exclusively feeds in reactive power kvar into the ring circuit 1 solely for the purpose of stabilizing its voltage. The stabilizing operation for the grid overall can thereby be more valuable than a reactive power feed-in. The information on when and how the operating point of the inverter 9 is to be changed, is thereby obtained by the inverter 9 from a voltage measuring device 11. This is connected to a different grid connection point 5b (a second grid connection point) than that to which the photovoltaic generator 7 is connected as energy generator EE (the first grid connection point). The other (second) grid connection point 5b is preferably in the center of the ring circuit 1, but can also be a grid connection point 5 at another location, which is assigned to a particularly unstable consumer V, in the operation of which many electrical machines are frequently to be started up.

The information on the prevailing voltage in the vicinity of or the at the weakest consumer V is provided to the inverter 9 as the mains voltage value by the voltage measuring device 11. This is carried out in a wired manner or wirelessly by means of techniques known per se, for example, also via a digital communications network, in particular also a radio network.

Figure 3:
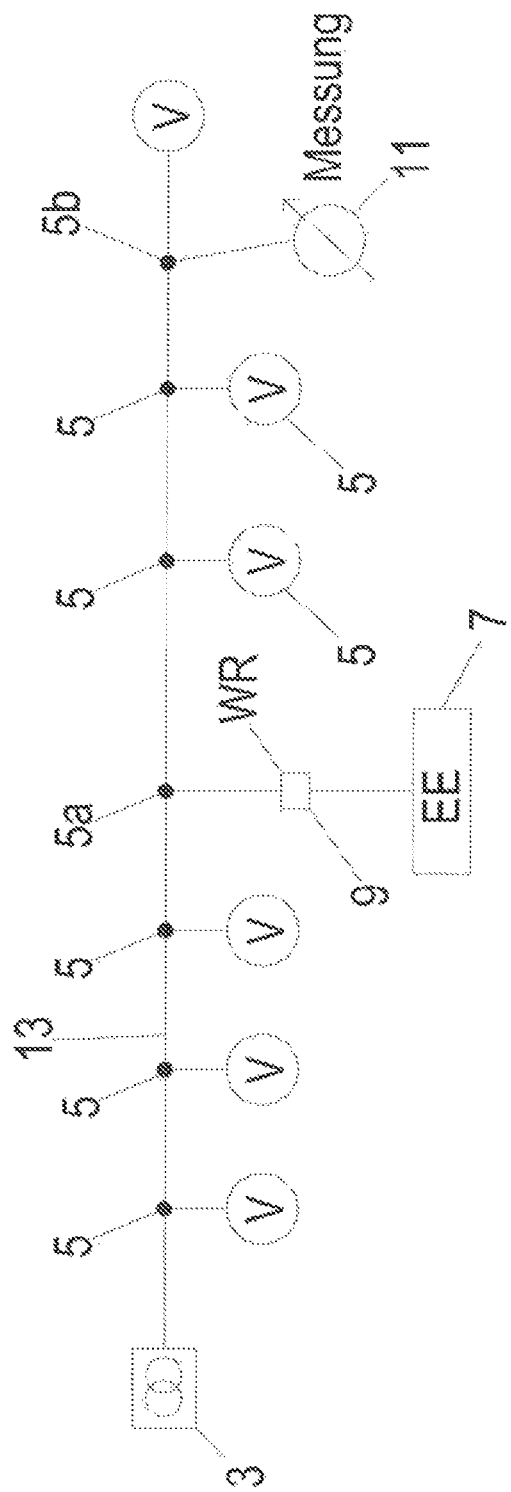
FIG. 3 is a stub line with a supply transformer and grid connection points and FIG. 4 illustrates two supply levels with energy consumers and energy generators.

In FIG. 3 identical parts are provided with the same reference numbers as in the other figures, wherein there is now a stub line 13 instead of the ring circuit 1. Here, too, many consumers V are connected to the stub line 13, wherein the weakest consumer V at the end of the stub line 13 is connected to the stub line via a grid connection point 5b. There the mains voltage value is also determined at a voltage measuring device 11, in order to pass it to the inverter 9 of the photovoltaic system 7 for operating control. All of the previous statements on the ring circuit 1 also apply analogously to the stub line 13 according to FIG. 3.

Figure 4:
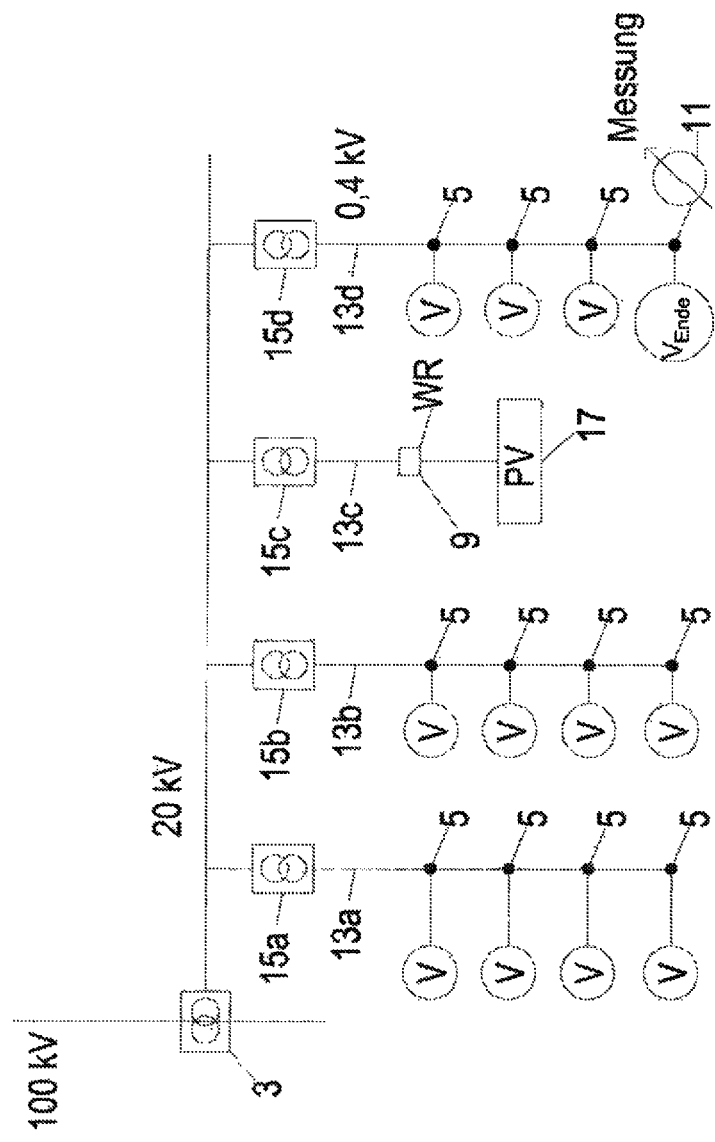

FIG. 4 shows a further variant of the inventive concept. There a first transformer 3 is present, which is stepped down from a 110 kV voltage level to a 20 kV level, from which a plurality of further transformers 15a through 15d are fed via assigned grid connection points 5'. The further transformers 15a through 15d transform the voltage in each case to 400 volts. From three (15a, 15b, 15d) of the further transformers 15 leads respectively one stub line 13a through 13d with several consumers V and/or small generators EE of regenerative energy connected to grid connection points 5. Each of the stub lines 13a, 13b and 13d is designed in principle according to FIG. 3. The last consumer $V_{Ende}$ at the rearmost stub line 13d, which is connected to the further transformer 15d, is provided with a voltage measuring device 11, in order to determine the mains voltage value prevailing there.

The stub line 13c, which branches from the further transformer 15c, leads to a solar power plant 17 and is used exclusively for connecting its inverter 9 in order to feed the energy generated directly into the medium-voltage level of 20 kV.

Deviating from FIGS. 2 and 3, here the measuring device 11 for measuring the mains voltage value for the operating control of the inverter is here on a different voltage level (e.g., the 400 volt level) than that at which the inverter 9 is connected, i.e., here the 20 kV level. Thus the reactive power kvar is fed or drawn on a different voltage level than that voltage level at which the control variable "mains voltage value" is determined. It is assumed thereby that not only the consumer $V_{Ende}$, but also all of the other consumers V that are connected to the grid connection points 5' of the 20 kV voltage level, e.g., an undervoltage is impending and all of these consumers benefit from an application of the method according to the invention with respect to the voltage supply quality.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a first energy generator in a public electric power supply system to which a plurality of electric consumers and at least the first energy generator, which is embodied as a regenerative energy generator, are connected via respectively one grid connection point each assigned thereto in the public electric power supply system, the method comprising:
providing an inverter for at least the first energy generator of a predetermined power rating, the AC voltage output of which is electrically connected to a first grid connection point assigned thereto in the public electric power supply system, wherein an operating control of the inverter with respect to its reactive power feed into the public electric power supply system and its reactive power draw out of the public electric power supply system takes place depending on a measured mains voltage value; and
measuring a mains voltage value at a second grid connection point within the public electric power supply system, which is different from the first grid connection point of the energy generator (EE); and
wherein a transformer is arranged in the public electric power supply system between the first grid connection point and the second grid connection point,
wherein, between the first grid connection point and the second grid connection point, at least one grid connection point is arranged,
wherein the public electric power supply system has different voltage ranges on different voltage levels, and
wherein the second grid connection point is arranged in a vicinity of or at a most voltage-sensitive grid connection point, the second grid connection point being a point at which the mains voltage value is measured for the operating control of the inverter of the first energy generator.

2. The method according to claim 1, wherein at least one grid connection point of a consumer is arranged between the first grid connection point and the second grid connection point.

3. The method according to claim 1, wherein an operating control of the inverter is directed to a maximization of the active power into the public electric power supply system (operation at the maximum power point MMP), wherein a specific definable reactive power value (feed or draw) is thereby maintained.

4. The method according to claim 1, wherein an operating control of the inverter is aligned to a maximization of the active power delivered into the public electric power supply system (operation at the maximum power point MPP), wherein in addition it feeds a reactive power quantity into the public electric power supply system or draws it therefrom, which corresponds to the difference of the currently delivered active power to the predetermined power rating of the inverter.

5. The method according to claim 1, wherein the mains voltage value is measured with a grid connection point at the end of a stub line or, with respect to a mains transformer feeding a ring circuit, in the center of the ring circuit.

6. The method according to claim 1, wherein a consumer with a highest fluctuation range in a reactive power demand is determined, and wherein the measurement of the mains voltage value is carried out at the grid connection point of this consumer.

7. The method according to claim 1, wherein the mains voltage at the grid connection points of several consumers at the same voltage level is determined such that a plurality of second grid connection points is formed and the operating control takes place based on a constructed mains voltage value determined by connection of different mains voltage values.

8. The method according to claim 1, wherein a sub supply grid connected to the electric power supply system via grid connection point is seen as a consumer of the electric power supply system.

9. The method according to claim 1, wherein several energy generators are operated in an electric power supply system, in which at least two regenerative energy generators feed into a single voltage level via grid connection points respectively assigned thereto, and wherein their reactive power component to be respectively supplied is divided among the inverters respectively assigned thereto such that a power loss of the inverters in total is minimized.

10. The method according to claim 1, wherein several energy generators are operated in an electric power supply system, in which at least two regenerative energy generators feed into a single voltage level via grid connection points respectively assigned thereto, and wherein the energy generator which is closest to the grid connection point at which the mains voltage value is determined is preferentially used for reactive power feed-in or for reactive power draw.

11. The method according to claim 1, wherein the first grid connection point and the second grid connection point are directly connected to the public electric power supply system.

12. The method according to claim 1, wherein the most voltage-sensitive point in the public electric power supply system is defined as an area of the public electric power supply system in which, based on a stub line, a last 20% of grid connection points are disposed.

13. The method according to claim 1, wherein the most voltage-sensitive point in the public electric power supply system is an area of the public electric power supply system in which, based on a ring circuit and starting from a mains transformer, which feeds the ring circuit, grid connection points located respectively 10% left and 10% right of the center of the ring circuit are disposed.

14. The method according to claim 1, wherein an operating control of the inverter of the first energy generator is such that an undervoltage measured at the second grid connection point, which falls under a threshold value, leads to a feed-in of reactive power by the inverter, and that an overvoltage measured at the second grid connection point, which reaches an upper threshold, leads to a draw on reactive power.

15. A circuit layout with an energy generator for a public electric power supply system with different voltage ranges on different voltage levels, the circuit layout comprising:
 an inverter; and
 a control device for the inverter, an output of the inverter being connected to a first grid connection point within the public electric power supply system for feeding electric power into the public electric power supply system, wherein an operating control of the inverter with respect to its reactive power feed into the public electric power supply system and its reactive power draw out of the public electric power supply system takes place depending on a measured mains voltage,
wherein the control device is connected to a second grid connection point within the public electric power supply system, which is different from the first grid connection point and is spaced apart therefrom, the second grid connection point being arranged on a different voltage level than the first grid connection point,
wherein at least one grid connection point and/or a transformer is arranged in the public electric power supply system between the first grid connection point and the second grid connection point, and
wherein the second grid connection point is arranged in a vicinity of or at a most voltage-sensitive grid connection point, the second grid connection point being a point at which the mains voltage value is measured for the operating control of the inverter of the first energy generator.

16. The circuit layout according to claim 15, wherein between the first grid connection point and the second grid connection point at least one further grid connection point is arranged with consumers and/or further energy generators connected thereto.

17. The circuit layout according to claim 15, wherein the first grid connection point and the second grid connection point are directly connected to the public electric power supply system.

* * * * *